US012510630B2

(12) United States Patent
Christoffers (10) Patent No.: US 12,510,630 B2
(45) Date of Patent: Dec. 30, 2025

(54) RADAR DEVICE WITH COMPENSATION OF NONLINEARITIES

(71) Applicant: Infineon Technologies AG, Neubiberg (DE)

(72) Inventor: Niels Christoffers, Vienna (AT)

(73) Assignee: Infineon Technologies AG, Neubiberg (DE)

( * ) Notice: Subject to any disclaimer, the term of this patent is extended or adjusted under 35 U.S.C. 154(b) by 353 days.

(21) Appl. No.: 18/194,185

(22) Filed: Mar. 31, 2023

(65) Prior Publication Data

US 2023/0324512 A1 Oct. 12, 2023

(30) Foreign Application Priority Data

Apr. 7, 2022 (DE) .......................... 102022108428.0

(51) Int. Cl.
*G01S 7/40* (2006.01)
*G01S 7/35* (2006.01)

(52) U.S. Cl.
CPC ............ *G01S 7/4069* (2021.05); *G01S 7/352* (2013.01); *G01S 7/40* (2013.01)

(58) Field of Classification Search
CPC ........... G01S 7/4069; G01S 7/352; G01S 7/40
USPC ........................................................ 342/173
See application file for complete search history.

(56) References Cited

U.S. PATENT DOCUMENTS

| | | | | |
|---|---|---|---|---|
| 4,450,447 A | * | 5/1984 | Zebker ................. | G01S 7/4052 342/25 R |
| 7,868,817 B2 | * | 1/2011 | Meyers ................. | G01S 13/933 342/36 |
| 7,876,867 B2 | * | 1/2011 | Filipovic ............... | H04B 1/525 375/346 |
| 7,880,672 B1 | * | 2/2011 | Doerry ................. | G01S 13/282 342/201 |
| 9,031,163 B2 | * | 5/2015 | Matsuo ................ | H04L 1/0033 375/299 |
| 9,325,358 B2 | * | 4/2016 | Cha ...................... | H04B 1/10 |

(Continued)

FOREIGN PATENT DOCUMENTS

| | | | |
|---|---|---|---|
| DE | 102018130088 A1 | 6/2019 | |
| EP | 3964853 B1 * | 3/2025 | ............ G01S 13/34 |

(Continued)

*Primary Examiner* — Nuzhat Pervin
(74) *Attorney, Agent, or Firm* — Harrity & Harrity, LLP (57) ABSTRACT

This description relates to a method for suppressing intermodulation distortion in a digital output signal of a radar device. In one implementation, the method includes—in a first mode—feeding a test signal into a receiving channel, the test signal is fed to a mixer contained in the receiving channel and is downconverted to a baseband, a baseband signal that includes intermodulation products on account of a nonlinearity of the transfer characteristic of the receiving channel being provided at the mixer output. The digital output signal is generated based on the baseband signal. The method further includes—in the first mode—determining an intermodulation product and, on the basis thereof, ascertaining a parameter of a model characterizing the nonlinearity. In a second mode, in which an antenna signal is fed to the mixer—suppressing the intermodulation product in the digital output signal based on the parameter and the baseband signal.

21 Claims, 5 Drawing Sheets

(56) References Cited

U.S. PATENT DOCUMENTS

| | | | | |
|---|---|---|---|---|
| 9,325,360 B2* | 4/2016 | Ahrari | H03F 1/3211 |
| 10,061,016 B2* | 8/2018 | Ginsburg | G01S 7/4008 |
| 10,097,287 B1* | 10/2018 | Schat | G01S 13/931 |
| 10,386,470 B2* | 8/2019 | Zivkovic | G01S 13/931 |
| 11,422,230 B2* | 8/2022 | Bogner | G01S 13/42 |
| 11,456,792 B1* | 9/2022 | Comberiate | H04B 1/123 |
| 11,635,489 B2* | 4/2023 | Fiore | G01S 7/4056 342/165 |
| 11,693,106 B2* | 7/2023 | Lang | G01S 13/931 342/109 |
| 11,921,196 B2* | 3/2024 | Kitsukawa | G01S 13/931 |
| 2003/0090405 A1* | 5/2003 | Rauch | G01S 7/038 342/107 |
| 2008/0039045 A1* | 2/2008 | Filipovic | H04B 1/109 375/346 |
| 2010/0265122 A1* | 10/2010 | Oswald | G01S 13/951 342/136 |
| 2012/0077453 A1* | 3/2012 | Ahrari | H04B 1/109 455/341 |
| 2014/0030988 A1* | 1/2014 | Fu | H04B 17/318 455/73 |
| 2014/0161005 A1* | 6/2014 | Laurent-Michel | H04B 15/00 370/281 |
| 2014/0269857 A1* | 9/2014 | Rimini | H04B 1/1036 375/285 |
| 2014/0364076 A1* | 12/2014 | Cha | H04B 1/30 455/295 |
| 2015/0206330 A1* | 7/2015 | Takechi | H04W 4/024 345/629 |
| 2015/0302622 A1* | 10/2015 | Takechi | G01C 21/20 345/629 |
| 2016/0020859 A1* | 1/2016 | Laurent-Michel | H04B 17/345 370/281 |
| 2016/0087604 A1* | 3/2016 | Kim | H03H 17/0261 708/304 |
| 2016/0187464 A1* | 6/2016 | Ginsburg | G01S 13/87 342/168 |
| 2016/0327644 A1* | 11/2016 | Pu | G01S 13/88 |
| 2017/0199270 A1* | 7/2017 | Huemer | G01S 13/343 |
| 2018/0120419 A1* | 5/2018 | Bialer | G01S 13/931 |
| 2019/0129003 A1* | 5/2019 | Longman | G01S 7/35 |
| 2019/0181964 A1* | 6/2019 | Christoffers | H04B 17/19 |
| 2019/0293749 A1* | 9/2019 | Itkin | G01S 13/931 |
| 2020/0124699 A1* | 4/2020 | Meissner | G01S 13/0209 |
| 2020/0209386 A1* | 7/2020 | Yoshimi | G01W 1/10 |
| 2020/0287587 A1* | 9/2020 | Cheung | G01S 7/52 |
| 2020/0393594 A1* | 12/2020 | Obata | G06V 40/10 |
| 2021/0025973 A1* | 1/2021 | Fiore | G01S 13/325 |
| 2021/0072349 A1* | 3/2021 | Mayer | G01S 7/4017 |
| 2021/0127088 A1* | 4/2021 | Brandhuber | H04N 7/084 |
| 2021/0149019 A1* | 5/2021 | Subburaj | G01S 7/40 |
| 2021/0210053 A1* | 7/2021 | Ng | G09G 5/14 |
| 2021/0286066 A1* | 9/2021 | Bharadwaj | G01S 13/343 |
| 2021/0325531 A1* | 10/2021 | Kitsukawa | G01S 7/354 |
| 2021/0382159 A1* | 12/2021 | Starzer | G01S 7/352 |
| 2022/0349992 A1* | 11/2022 | Tsutsumi | G01S 7/4069 |
| 2023/0144796 A1* | 5/2023 | DePoy | G06N 20/00 706/12 |
| 2023/0324544 A1* | 10/2023 | Park | G01S 13/931 |

FOREIGN PATENT DOCUMENTS

| | | | | |
|---|---|---|---|---|
| WO | WO-2008021815 A1 * | 2/2008 | | H04B 1/123 |
| WO | WO-2012050864 A1 * | 4/2012 | | H03F 1/32 |
| WO | 2014036984 A1 | 3/2014 | | |

* cited by examiner

Fig. 6 (Model of the nonlinearity of the receiving channel)

RADAR DEVICE WITH COMPENSATION OF NONLINEARITIES

CROSS REFERENCE TO RELATED APPLICATION

This application claims priority to German Patent Application No. 102022108428.0 filed on Apr. 7, 2022, the content of which is incorporated by reference herein in its entirety.

TECHNICAL FIELD

The present disclosure relates to the field of radio-frequency (RF) circuits, in particular a radar sensor device having the ability to compensate for nonlinearities.

BACKGROUND

Modern radar sensor devices such as, for example, radar distance and speed sensors can be integrated in so-called monolithic microwave integrated circuits (MMICs). Radar sensors can be used in the automotive sector, for example, where they are used in so-called modern driver assistance systems (advanced driver-assistance systems, ADAS) such as, for example, systems with cruise control (adaptive cruise control, ACC) or radar cruise control. Such systems can also be used for autonomous driving.

A radar MMIC can contain all core functions of the RF frontend of a radar transceiver (e.g., a local oscillator, power amplifiers, low-noise amplifiers (LNAs), mixers, etc.), the analog preprocessing of the intermediate frequency (IF) signal or of the baseband signal (e.g., filters, amplifiers, etc.) and the analog-to-digital conversion and optionally also parts of the downstream digital signal processing in a single package.

Modern radar sensor systems often comprise a multiplicity of transmitting channels and receiving channels in order to be able to detect radar targets more accurately (in particular the azimuth angles thereof in relation to the radar sensor). In the case of such MIMO (Multiple-Input Multiple-Output), transmitting and receiving channels can also be distributed among a plurality of different MMICs. The digital signal processing can be carried out in a separate digital signal processor. However, parts of the digital signal processing chain (e.g., digital preprocessing of the received radar data upstream of the detection of the radar targets) can be integrated in the MMICs (radar chips).

Some components of the RF frontend and of the analog baseband signal processing chain can have nonlinearities which can adversely affect the accuracy of the radar measurements. Therefore, the design of the analog part of a radar system aims to ensure a high linearity of the components (for example mixers, amplifiers, filters, etc.) in the signal processing chain. The example implementations described here address this problem of unavoidable nonlinearities.

SUMMARY

Hereinafter a description is given of a radar device. In accordance with one example implementation, the radar device includes a receiving channel having a mixer, which is configured to generate a baseband signal from an RF input signal by mixing with a local oscillator signal. The receiving channel is further configured to generate a digital output signal based on the baseband signal, wherein the baseband signal includes intermodulation products on account of a nonlinearity of the transfer characteristic of parts of the receiving channel. The radar device further includes a test signal generator, which is configured to generate a test signal and to feed the latter into an RF signal path of the receiving channel. A signal processing unit is configured, in a first mode, in which the test signal is fed to the mixer as input signal, to determine at least one intermodulation product and to ascertain therefrom a parameter of a model which characterizes the nonlinearity, and to store the parameter. The signal processing unit is further configured, in a second mode, in which an antenna signal is fed to the mixer as input signal, to attenuate the intermodulation product in the digital output signal based on the parameter and the baseband signal.

Furthermore, a description is given of a method for suppressing intermodulation distortion in a digital output signal of a radar device. In accordance with one example implementation, the method includes—in a first mode—feeding a test signal into a receiving channel of the radar device, such that the test signal is fed to a mixer contained in the receiving channel and is thus downconverted to the baseband, wherein a baseband signal that includes intermodulation products on account of a nonlinearity of the transfer characteristic of the receiving channel is provided at the mixer output. The digital output signal is generated based on the baseband signal. The method further includes—in the first mode—determining at least one intermodulation product and, on the basis thereof, ascertaining a parameter of a model which characterizes the nonlinearity, and storing the parameter. The method finally includes—in a second mode, in which an antenna signal is fed to the mixer as input signal—suppressing the intermodulation product in the digital output signal based on the parameter and the baseband signal.

BRIEF DESCRIPTION OF THE DRAWINGS

Various implementations are explained in greater detail below based on examples illustrated in the drawings. The illustrations are not necessarily true to scale and the implementation is not restricted only to the aspects illustrated. Rather, importance is attached to illustrating the principles underlying the example implementations illustrated.

DETAILED DESCRIPTION

Figure 1:
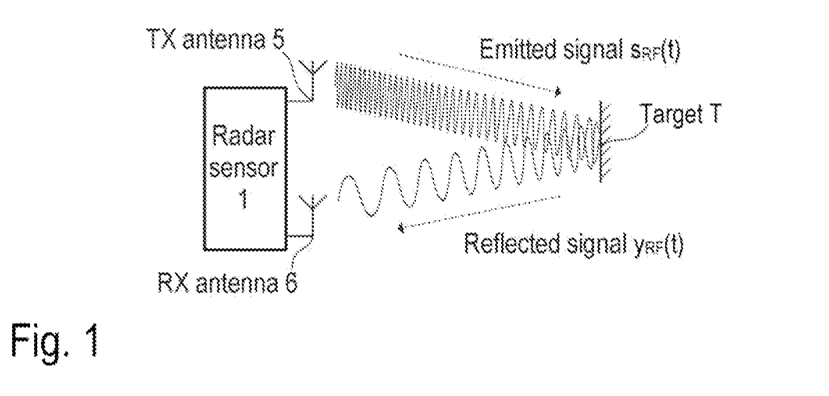
FIG. 1 is a drawing which illustrates the manner of operation of an FMCW radar system for distance and/or speed measurement.

FIG. 1 illustrates the application of a frequency-modulated continuous-wave (FMCW) radar system as sensor for the measurement of distances and speeds of objects, which are usually referred to as radar targets. In the present example, the radar device 1 comprises separate transmitting (TX) and receiving (RX) antennas 5 and 6, respectively (bistatic or pseudo-monostatic radar configuration). It should be noted, however, that one antenna can also be used, which serves simultaneously as transmitting antenna and as receiving antenna (monostatic radar configuration). The transmitting antenna 5 emits an RF signal $s_{RF}(t)$, which is frequency-modulated for example with a linear chirp signal (periodic, linear frequency ramp). The emitted signal $s_{RF}(t)$ is backscattered at the radar target T and the backscattered (reflected) signal $y_{RF}(t)$ is received by the receiving antenna 6. FIG. 1 shows a simplified example; in practice, radar sensors are systems comprising a plurality of transmitting (TX) and receiving (RX) channels (in order to be able to measure angles of incidence as well), and the emitted RF signals include sequences having a multiplicity of chirps in each case. Furthermore, the examples described here are not restricted to FMCW radar systems, but rather can also be applied in other radar systems, such as e.g., in phase-modulated continuous-wave (PMCW) radar systems.

Figure 2:
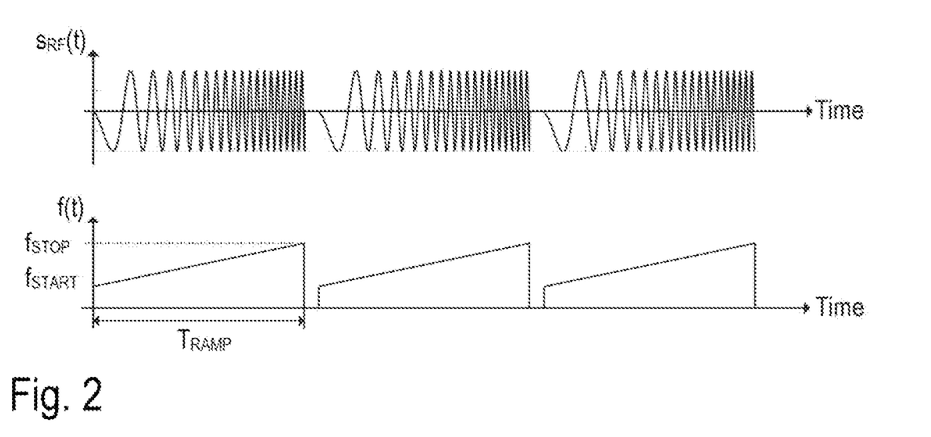
FIG. 2 contains two timing diagrams which illustrate the frequency modulation of the RF signal used in FMCW radar systems.

FIG. 2 illustrates by way of example the abovementioned frequency modulation of the signal $s_{RF}(t)$. As illustrated in FIG. 2, the signal $s_{RF}(t)$ is composed of a multiplicity of "chirps" (grouped in sequences). That is to say that the signal $s_{RF}(t)$ comprises a sequence of sinusoidal signal profiles (waveforms) having a rising (up-chirp) or falling (down-chirp) frequency (see upper diagram in FIG. 2). In the present example, the instantaneous frequency f(t) of a chirp beginning at a start frequency $f_{START}$ rises linearly within a time period $T_{RAMP}$ to a stop frequency $f_{STOP}$ (see lower diagram in FIG. 2). Such chirps are also referred to as "linear frequency ramps". FIG. 2 illustrates three identical linear frequency ramps. It should be noted, however, that the parameters $f_{START}$, $f_{STOP}$, $T_{RAMP}$ and also the pauses between the individual frequency ramps can vary. The frequency variation also need not necessarily be linear.

Figure 3:
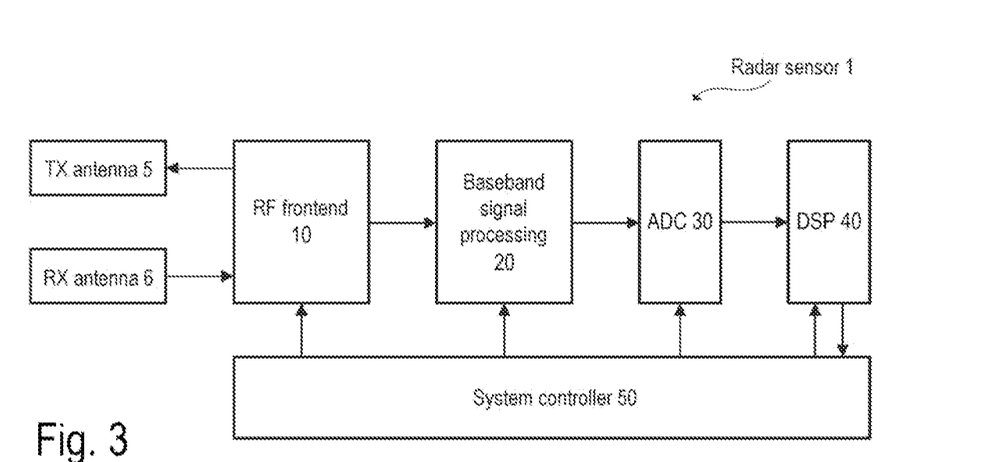
FIG. 3 is a block diagram which illustrates the basic structure of an FMCW radar device.

FIG. 3 is a block diagram which illustrates one possible structure of a radar system 1 (radar device, radar sensor) by way of example. Accordingly, at least one transmitting antenna 5 (TX antenna) and at least one receiving antenna 6 (RX antenna) are connected to an RF frontend 10 which is integrated in an MMIC and which can include all those circuit components which are required for the RF signal processing. The circuit components comprise for example a local oscillator (LO), RF power amplifiers, phase shifters, low-noise amplifiers (LNAs), directional couplers (e.g., rat race couplers, circulators, etc.) and mixers for downconverting the RF signals to baseband or an intermediate frequency band (IF band). No distinction is drawn between baseband and IF band in this description. The RF frontend 10—if appropriate together with further circuit components—can be integrated in an MMIC (radar chip). The example illustrated shows a bistatic (or pseudo-monostatic) radar system comprising separate RX and TX antennas. In the case of a monostatic radar system, a single antenna would be used both for emitting and for receiving the electromagnetic (radar) signals. In this case, a directional coupler (e.g., a circulator) can be used to separate the RF signals to be emitted from the RF signals (radar echoes) received.

As mentioned, radar systems in practice usually comprise a plurality of transmitting and receiving channels having a plurality of transmitting and receiving antennas, respectively, which makes it possible, inter alia, to measure the direction (DoA, direction of arrival) from which the radar echoes are received. This direction is usually represented by an angle (azimuth angle). In MIMO systems of this type, the individual TX channels and RX channels are usually constructed identically or similarly in each case. That is to say that the radar frontend 10 can comprise a multiplicity of transmitting and receiving channels which can be distributed among a plurality of radar chips.

The RF signals emitted via the TX antennas can lie e.g., in the range of approximately 20 GHz to 100 GHz (e.g., around 80 GHz in applications in the automotive sector). As mentioned, the RF signals received by the RX antennas include the radar echoes, e.g., those signal components which are backscattered at one or at a plurality of radar targets. The RF signal $y_{RF}(t)$ received in a receiving channel is downconverted to baseband and processed further in baseband using analog signal processing (see FIG. 3, analog baseband signal processing chain 20). The aforementioned analog signal processing in baseband substantially comprises filtering and, if appropriate, amplification of the baseband signal. The baseband signal is finally digitized (see FIG. 3, analog-to-digital converter 30) and processed further in the digital domain.

The digital signal processing chain can be implemented in a digital signal processing unit (also referred to as a digital computing unit). The computing unit can be realized at least partly as software which can be executed on a processor, for example a microcontroller or a digital signal processor (see FIG. 3, DSP 40). The computing unit can also comprise hardwired and one-time programmable computing circuits. In this description, signal processing unit/computing unit is understood to mean any functional unit which is suitable and is configured for carrying out the calculations described here. The computing unit can also be distributed among a plurality of integrated circuits.

The overall system is generally controlled using a system controller 50, which can likewise be implemented at least partly as software which can be executed on a processor such as e.g., a microcontroller. The RF frontend 10 and the analog baseband signal processing chain 20 (and optionally also the analog-to-digital converter 30 and parts of the digital signal processing) can be integrated jointly in a single MMIC (e.g., an RF semiconductor chip). Alternatively, the individual components can also be distributed among a plurality of integrated circuits. The system controller 50 is usually configured to communicate with the MMICs via a bus system (e.g., a Serial Peripheral Interface, SPI). In this way, the system controller can configure and control the circuit components of the analog frontend that are contained in the MMICs.

Figure 4:
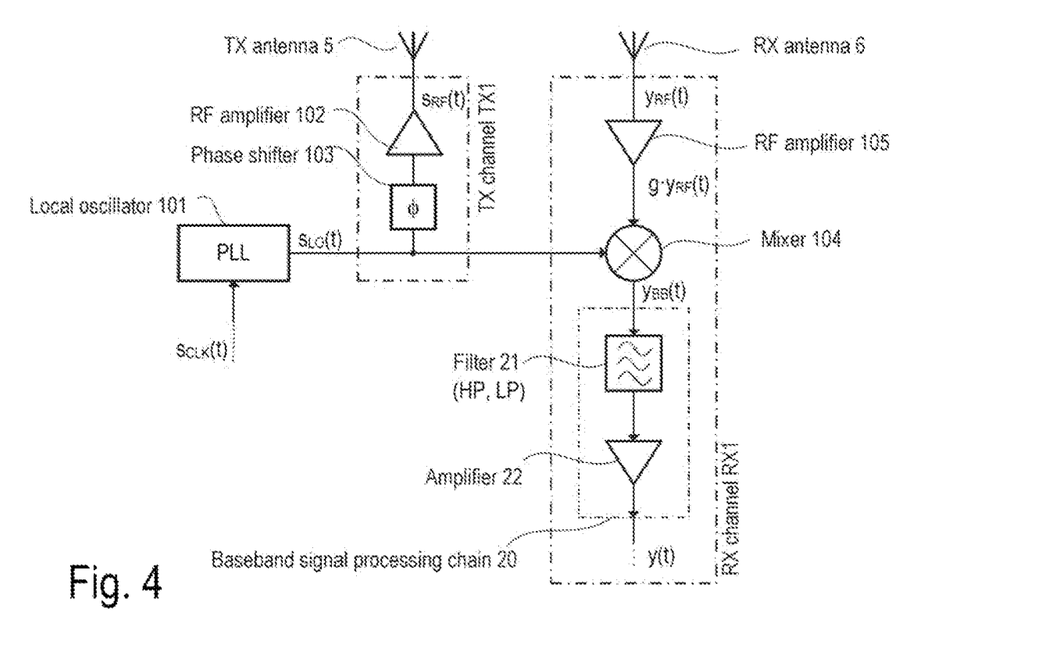
FIG. 4 is a circuit diagram which illustrates an example of an analog RF frontend which can be contained in the FMCW radar device from FIG. 3.

FIG. 4 shows an example implementation of the analog frontend (RF frontend 10 with baseband signal processing chain 20 connected downstream), which can be part of the radar system from FIG. 3. It should be noted that FIG. 4 illustrates a simplified circuit diagram in order to show the fundamental structure of the RF frontend with one transmitting channel (TX channel TX1) and one receiving channel (RX channel RX1). Actual implementations, which may depend greatly on the specific application, can be more complex, of course, and generally comprise a plurality of TX and RX channels.

The RF frontend 10 comprises a local oscillator 101 (LO), which generates an RF oscillator signal $s_{LO}(t)$. The RF oscillator signal $s_{LO}(t)$, as described above with reference to FIG. 2, can be frequency-modulated during measurement operation and is also referred to as LO signal. The LO 101 can also be configured for continuous-wave operation (CW operation), which may be necessary for calibration measurement, for example. In radar applications, the LO signal usually lies in the SHF (Super High Frequency, centimeter-wave) or in the EHF (Extremely High Frequency, millimeter-wave) band, e.g., in the interval of 76 GHz to 81 GHz or in the 24 GHz ISM band (Industrial, Scientific and Medical Band) in some automotive applications.

The LO signal $s_{LO}(t)$ is processed both in the transmission signal path (in the TX channel) and in the reception signal path (in the RX channel). The transmission signal $s_{RF}(t)$ (cf. FIG. 2), emitted by the TX antenna 5, is generated by amplifying the LO signal $s_{LO}(t)$, for example using the RF power amplifier 102, and is thus merely an amplified version of the LO signal $s_{LO}(t)$. The phase shifter 103 contained in the TX channel TX1 can bring about an additional adaptation of the phase of the transmission signal $s_{RF}(t)$ by a phase shift $\Delta\phi_{TX1}$. The output of the amplifier 102 can be coupled to the TX antenna 5 (if appropriate via a passive matching network). The RF radar signal $y_{RF}(t)$ received by the RX antenna 6 is fed to the receiver circuit in the RX channel and thus directly or indirectly to the RF port of the mixer 104. In the present example, the received RF radar signal $y_{RF}(t)$ (antenna signal) is preamplified using the amplifier 105 (gain g). The amplified RF reception signal $g \cdot y_{RF}(t)$ is thus fed to the mixer 104. The amplifier 105 can be e.g., an LNA (Low-Noise Amplifier).

The LO signal $s_{LO}(t)$ is fed to the reference port of the mixer 104, such that the mixer 104 downconverts the (preamplified) RF radar signal $y_{RF}(t)$ to baseband. The resulting baseband signal (mixer output signal) is designated by $y_{BB}(t)$ in FIG. 4. This baseband signal $y_{BB}(t)$ is firstly processed further in analog fashion, wherein the analog baseband signal processing chain 20 substantially brings about amplification (amplifier 22) and filtering (e.g., bandpass filter 21 or a combination of high-pass filter and low-pass filter) in order to suppress undesired sidebands and image frequencies. The resulting analog output signal, which is fed to an analog-to-digital converter (see FIG. 3, ADC 30), is designated by y(t). Methods for the digital further processing of the output signal (digital radar signal y[n]) for the detection of radar targets (at least one out of distance, speed and DoA) are known per se (for example range Doppler analysis) and therefore will not be discussed in further detail here.

In the present example, the mixer 104 downconverts the preamplified RF reception signal $g \cdot y_{RF}(t)$ (e.g., the amplified antenna signal) to baseband. The mixing can take place in one stage (that is to say from the RF band directly to baseband) or via one or more intermediate stages (that is to say from the RF band to an intermediate frequency band and further to baseband). In this case, the reception mixer 104 effectively comprises a plurality of individual mixer stages connected in series. The mixer 104 can also be configured as an IQ mixer, which yields a complex signal having a real part and an imaginary part as the baseband signal. The real signal component is also referred to as in-phase component (I), and the imaginary component as quadrature component (Q) (hence the name IQ mixer).

The filter 21 in the analog baseband processing chain can be implemented as a series circuit comprising high-pass filter and low-pass filter. These filters can be active or passive RC filters, and the filter characteristic is dependent, in particular, on the components (resistors and capacitors) from which the filter is constructed (active filters generally also contain an amplifier). These analog components (e.g., amplifiers 105 and 22, mixer 104) contained in a receiving channel and also the analog-to-digital converter used for digitizing the output signal y(t) may have undesired nonlinearities which can adversely affect the quality of the radar measurement. Ideally, all analog circuit components of the RX channel have a linear characteristic (characteristic curve). In reality, however, the characteristic curves of these circuit components deviate from ideally linear characteristic curves. These deviations are jointly encompassed by the term nonlinearities.

Figure 5:
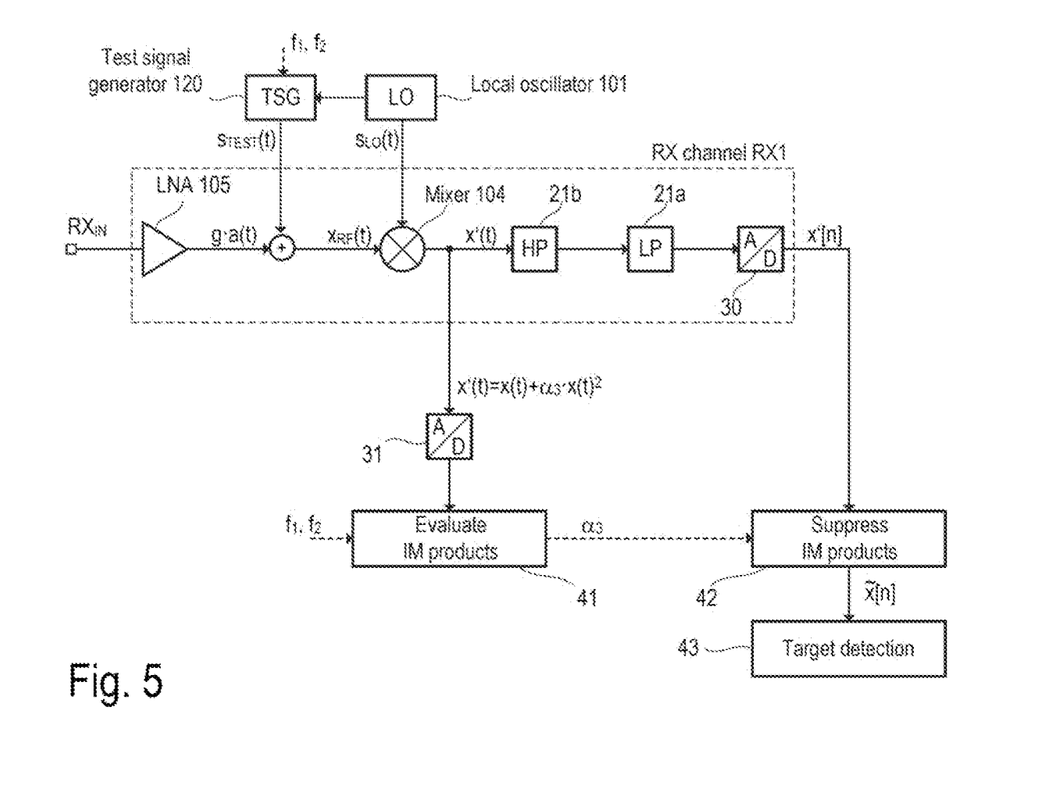
FIG. 5 is an example of a receiving channel of a radar system having further components for identifying one or more model parameters for describing nonlinear distortions and for suppressing such distortions.

The nonlinearity in the receiving channel RX1 is principally caused by the mixer 104. The nonlinearity causes so-called intermodulation products (IM products) in baseband, these products also being referred to as intermodulation distortion (IMD). FIG. 5 illustrates a concept for quantitatively determining the nonlinearity based on an example, according to which concept one or more IM products are detected in the baseband signal and one or more parameters of a model which characterizes the nonlinearity are calculated therefrom. This procedure can also be referred to as parameter identification. The model and calculated parameters can be used in the downstream digital signal processing in order to suppress the IM product(s). A complete cancellation of the IM products is desirable, but can be achieved only with difficulty in practice. The aim of the concept described here is to suppress the relevant IM products in order to improve the quality of the radar measurements.

Only one receiving channel RX1 is illustrated in the example from FIG. 5, this receiving channel being constructed very similarly to that in the example from FIG. 4. The signal received by an antenna is received at an antenna port $RX_{IN}$ of the receiving channel RX1 and is fed to the RF amplifier 105 (e.g., an LNA). The amplified antenna signal is designated by a(t) in FIG. 5. As an alternative to the antenna signal, an RF test signal $s_{TEST}(t)$ can be fed into the RF signal path. In accordance with the example illustrated, the antenna signal a(t) and the test signal $s_{TEST}(t)$ are added, e.g., superposed. This addition/superposition can be realized using an RF coupler 106, for example. The summation signal, which is fed to the RF port of the mixer 104, is designated by $x_{RF}(t)$ in FIG. 5. The coupler 106 is symbolized by an adder in FIG. 5. In practice, either the antenna signal a(t) or the RF test signal $s_{TEST}(t)$ can be zero, for which reason an RF switch can also be used instead of the coupler 106. A wide variety of suitable implementations of RF couplers and RF switches are known per se. They will therefore not be discussed any further here. In the example implementations described here, either $x_{RF}(t)=s_{TEST}(t)$ (first mode, a(t)=0) or $x_{RF}(t)=a(t)$ (second mode $s_{TEST}(t)=0$) holds true depending on the operating mode of the radar system. In another example implementation, the test signal is fed into the RF signal path upstream of the LNA 105. In this case, $x_{RF}(t)=g \, s_{TEST}(t)$ holds true in the first mode, where g denotes the gain of the LNA 105.

The local oscillator signal $s_{LO}(t)$ (LO signal, frequency $f_{LO}$) generated by the local oscillator 101 is fed to the reference port of the mixer 104, and is mixed with the input signal $x_{RF}(t)$ at the RF port of the mixer. The resulting baseband signal is designated by x'(t) in FIG. 5. As mentioned above, this baseband signal x'(t) contains IM products (also called IMDs) that arise as a result of the nonlinearity of the mixer (and, if appropriate, of the LNA 105).

In the example illustrated, the test signal $s_{TEST}(t)$ is generated by the test signal generator 120 (TSG). This test signal generator can be configured for example as a modulator configured to modulate the LO signal $s_{LO}(t)$. In the example illustrated, the LO signal $s_{LO}(t)$ is modulated with a modulation signal having two individual frequencies $f_1$, $f_2$. Such a signal is also referred to as a two-tone signal. However, test signals having more than two frequencies/ "tones" are also possible. Depending on the type of modulation (e.g., single-sideband modulation or double-sideband modulation), the test signal $s_{TEST}(t)$ can have spectral lines at the frequencies $f_{LO}+f_1$, $f_{LO}+f_2$, $f_{LO}-f_1$, and $f_{LO}-f_2$. However, the test signal generator 120 need not necessarily generate the test signal using modulation of the LO signal $s_{LO}(t)$. As an alternative, a phase locked loop synchronized with the phase locked loop of the local oscillator 101 could also be used.

In accordance with FIG. 5, the baseband signal x'(t) passes via the filters 21a (high-pass filter) and 21b (low-pass filter) to the analog-to-digital converter 30, which outputs the digitized signal x' [n]. In order not to make the following discussion unnecessarily complicated, it is assumed that the filters 21a and 21b (and an amplifier possibly present, not illustrated in FIG. 5) do not alter the spectrum of the baseband signal x'(t) that is relevant for the detection of the radar targets. That is to say that it can be assumed that x'[n] x'(n·$T_S$) holds true, where n is an integral time index and $T_S$ denotes the sampling time.

Figure 6:
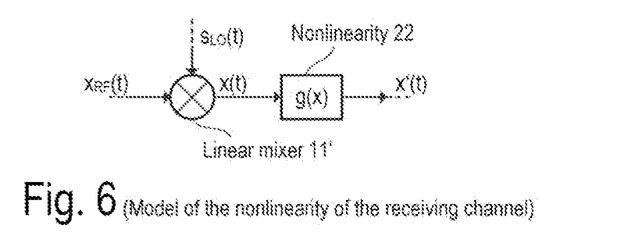
FIG. 6 shows a simple model according to which the nonlinearities of the mixer in the RX channel of a radar sensor device are lumped together in a memoryless nonlinear system.

Before the parameter identification mentioned above is discussed further, reference is briefly made to the model illustrated in FIG. 6. Accordingly, all nonlinearities that occur in the RF signal path and in the mixer are lumped together in a nonlinear system 22 characterized by the nonlinear transfer function g(•). All other components are assumed to be ideally linear (cf. FIG. 6, linear mixer 104'). In accordance with FIG. 6, the mixer 104' yields the baseband signal x(t) without IM products. In accordance with the model presented here, the products are generated by the nonlinear system 22, the baseband signal x'(t) distorted by IM products being given by the equation x'(t)=g (x(t)).

In the example illustrated, the nonlinear system g(x) is memoryless, e.g., static. The present value of the output signal of the system g(x) is dependent only on the present input value of the system and not on the "history" of the preceding values of the input signal. This is not necessarily the case, however; nonlinear systems having memory, e.g., nonlinear dynamic systems, can also be considered in other example implementations.

$$g(x)g(x) \approx \Sigma_{i=1}^L \alpha_i \cdot x^i = \alpha_1 \cdot x + \alpha_2 \cdot x^2 + \alpha_3 \cdot x^3 + \ldots$$
$$\alpha_L \cdot x^L \alpha_i \alpha_1 \cdot xg(-x) = -g(x)\alpha_i = 0$$

Figure 7:
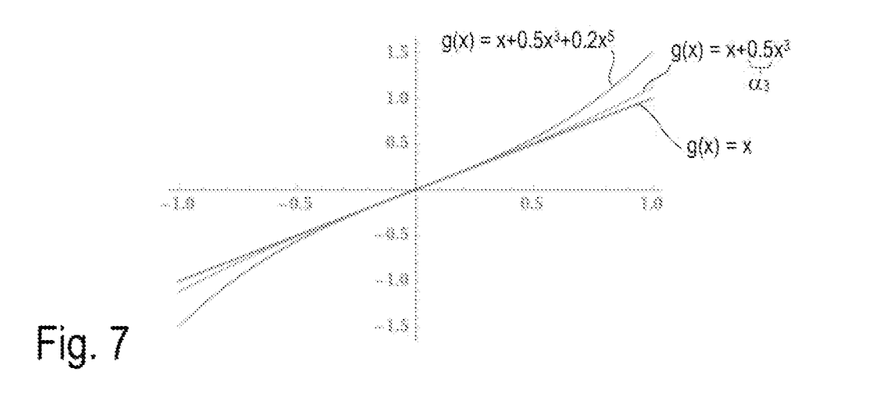
FIG. 7 illustrates by way of example nonlinear characteristic curves which can be characterized by Taylor series.

A memoryless nonlinear system can be approximated using a Taylor series:

$$g(x)g(x) \approx \Sigma_{i=1}^L \alpha_i \cdot x^i = \alpha_1 \cdot x + \alpha_2 \cdot x^2 + \alpha_3 \cdot x^3 + \ldots$$
$$\alpha_L \cdot x^L \alpha_i \alpha_1 \cdot xg(-x) = -g(x)\alpha_i = 0$$

$$g(x)g(x) \approx \Sigma_{i=1}^L \alpha_i \cdot x^i = \alpha_1 \cdot x + \alpha_2 \cdot x^2 + \alpha_3 \cdot x^3 + \ldots$$
$$\alpha_L \cdot x^L \alpha_i \alpha_1 \cdot xg(-x) = -g(x)\alpha_i = 0$$

$$g(x)g(x) \approx \Sigma_{i=1}^L \alpha_i \cdot x^i = \alpha_1 \cdot x + \alpha_2 \cdot x^2 + \alpha_3 \cdot x^3 + \ldots$$
$$\alpha_L \cdot x^L \alpha_i \alpha_1 \cdot xg(-x) = -g(x)\alpha_i = 0$$

$$g(x)g(x) \approx \Sigma_{i=1}^L \alpha_i \cdot x^i = \alpha_1 \cdot x + \alpha_2 \cdot x^2 + \alpha_3 \cdot x^3 + \ldots$$
$$\alpha_L \cdot x^L \alpha_i \alpha_1 \cdot xg(-x) = -g(x)\alpha_i = 0 \quad (1)$$

where L denotes the highest power of the Taylor series (referred to as Taylor series expansion to the L-th power). The parameters are referred to as Taylor coefficients (i=1, . . . , L). The first term of the sum is referred to as a linear term. The subsequent higher-order terms represent the nonlinearities. Examples of approximations of a nonlinear characteristic curve are illustrated by way of example in FIG. 7. In the example illustrated, the nonlinear characteristic curve is an odd function (e.g., which need not necessarily be the case), for which reason the terms with even-numbered powers are zero (if i even). In practice, a Taylor series expansion to the third power is often sufficient to characterize the nonlinearity with sufficient accuracy. However, the examples described here are not restricted thereto, since this concept can be extended to terms with an order of greater than three without any problems.

$$x(t)x(t) = \hat{x}\cos(\omega t)\hat{x}\omega g(\cdot)\alpha_i x'(t)x'(t) =$$
$$g(x(t)) = \left(\alpha_1 \hat{x} - \frac{3}{4}\alpha_3 \hat{x}^3\right)\cos(\omega t) - \frac{1}{4}\alpha_3 \hat{x}^3 \cos(3\omega t)\omega 3\omega x_{RF}(t)x(t) =$$
$$\hat{x}(\cos(2\pi f_1 t) + \cos(2\pi f_2 t))\alpha_3$$

Hereinafter—as an illustrative example and merely to illustrate the effect of the nonlinearity—a baseband signal is considered which can be described by a cosine function, e.g., $$x(t)x(t) = \hat{x}\cos(\omega t)\hat{x}\omega g(\cdot)\alpha_i x'(t)x'(t) = \quad (2)$$
$$g(x(t)) = \left(\alpha_1 \hat{x} - \frac{3}{4}\alpha_3 \hat{x}^3\right)\cos(\omega t) - \frac{1}{4}\alpha_3 \hat{x}^3 \cos(3\omega t)\omega 3\omega x_{RF}(t)x(t) =$$
$$\hat{x}(\cos(2\pi f_1 t) + \cos(2\pi f_2 t))\alpha_3$$

$$x(t)x(t) = \hat{x}\cos(\omega t)\hat{x}\omega g(\cdot)\alpha_i x'(t)x'(t) =$$
$$g(x(t)) = \left(\alpha_1 \hat{x} - \frac{3}{4}\alpha_3 \hat{x}^3\right)\cos(\omega t) - \frac{1}{4}\alpha_3 \hat{x}^3 \cos(3\omega t)\omega 3\omega x_{RF}(t)x(t) =$$
$$\hat{x}(\cos(2\pi f_1 t) + \cos(2\pi f_2 t))\alpha_3.$$

$$x(t)x(t) = \hat{x}\cos(\omega t)\hat{x}\omega g(\cdot)\alpha_i x'(t)x'(t) =$$
$$g(x(t)) = \left(\alpha_1 \hat{x} - \frac{3}{4}\alpha_3 \hat{x}^3\right)\cos(\omega t) - \frac{1}{4}\alpha_3 \hat{x}^3 \cos(3\omega t)\omega 3\omega x_{RF}(t)x(t) =$$
$$\hat{x}(\cos(2\pi f_1 t) + \cos(2\pi f_2 t))\alpha_3$$

$$x(t)x(t) = \hat{x}\cos(\omega t)\hat{x}\omega g(\cdot)\alpha_i x'(t)x'(t) =$$
$$g(x(t)) = \left(\alpha_1 \hat{x} - \frac{3}{4}\alpha_3 \hat{x}^3\right)\cos(\omega t) - \frac{1}{4}\alpha_3 \hat{x}^3 \cos(3\omega t)\omega 3\omega x_{RF}(t)x(t) =$$
$$\hat{x}(\cos(2\pi f_1 t) + \cos(2\pi f_2 t))\alpha_3$$

In this case, denotes the amplitude and the angular frequency of the signal. It is furthermore assumed that the nonlinearity (cf. FIG. 6, nonlinear system 22) can be described (approximated) by a Taylor series up to the third order (L=3), e.g., the coefficients are zero for i>3. In this case, the following arises for the distorted baseband signal:

$$x(t)x(t) = \hat{x}\cos(\omega t)\hat{x}\omega g(\cdot)\alpha_i x'(t)x'(t) = \quad (3)$$
$$g(x(t)) = \left(\alpha_1 \hat{x} - \frac{3}{4}\alpha_3 \hat{x}^3\right)\cos(\omega t) - \frac{1}{4}\alpha_3 \hat{x}^3 \cos(3\omega t)\omega 3\omega x_{RF}(t)x(t) =$$
$$\hat{x}(\cos(2\pi f_1 t) + \cos(2\pi f_2 t))\alpha_3$$

-continued $$x(t)x(t) = \hat{x}\cos(\omega t)\hat{x}\omega g(\cdot)\alpha_i x'(t)x'(t) =$$
$$g(x(t)) = \left(\alpha_1\hat{x} - \frac{3}{4}\alpha_3\hat{x}^3\right)\cos(\omega t) - \frac{1}{4}\alpha_3\hat{x}^3\cos(3\omega t)\omega 3\omega x_{RF}(t)x(t) =$$
$$\hat{x}(\cos(2\pi f_1 t) + \cos(2\pi f_2 t))\alpha_3.$$

$$x(t)x(t) = \hat{x}\cos(\omega t)\hat{x}\omega g(\cdot)\alpha_i x'(t)x'(t) =$$
$$g(x(t)) = \left(\alpha_1\hat{x} - \frac{3}{4}\alpha_3\hat{x}^3\right)\cos(\omega t) - \frac{1}{4}\alpha_3\hat{x}^3\cos(3\omega t)\omega 3\omega x_{RF}(t)x(t) =$$
$$\hat{x}(\cos(2\pi f_1 t) + \cos(2\pi f_2 t))\alpha_3$$

$$x(t)x(t) = \hat{x}\cos(\omega t)\hat{x}\omega g(\cdot)\alpha_i x'(t)x'(t) =$$
$$g(x(t)) = \left(\alpha_1\hat{x} - \frac{3}{4}\alpha_3\hat{x}^3\right)\cos(\omega t) - \frac{1}{4}\alpha_3\hat{x}^3\cos(3\omega t)\omega 3\omega x_{RF}(t)x(t) =$$
$$\hat{x}(\cos(2\pi f_1 t) + \cos(2\pi f_2 t))\alpha_3$$

Power is thus shifted from the fundamental (angular frequency) toward the higher harmonic with the angular frequency. This higher harmonic (and further higher-order harmonics) would be practically eliminated by the low-pass filter (cf. FIG. 5, filter 21a) or the low-pass filter characteristic of the mixer 104 in the baseband signal processing chain. Higher harmonics are therefore unproblematic in practice. If the RF signal fed to the mixer 104 has a plurality of frequencies (which is the case if the test signal $s_{TEST}(t)$ is fed in instead of an antenna signal, the test signal being modulated with a two-tone signal), $$x(t)x(t) = \hat{x}\cos(\omega t)\hat{x}\omega g(\cdot)\alpha_i x'(t)x'(t) = \quad (4)$$
$$g(x(t)) = \left(\alpha_1\hat{x} - \frac{3}{4}\alpha_3\hat{x}^3\right)\cos(\omega t) - \frac{1}{4}\alpha_3\hat{x}^3\cos(3\omega t)\omega 3\omega x_{RF}(t)x(t) =$$
$$\hat{x}(\cos(2\pi f_1 t) + \cos(2\pi f_2 t))\alpha_3$$

$$x(t)x(t) = \hat{x}\cos(\omega t)\hat{x}\omega g(\cdot)\alpha_i x'(t)x'(t) =$$
$$g(x(t)) = \left(\alpha_1\hat{x} - \frac{3}{4}\alpha_3\hat{x}^3\right)\cos(\omega t) - \frac{1}{4}\alpha_3\hat{x}^3\cos(3\omega t)\omega 3\omega x_{RF}(t)x(t) =$$
$$\left.\hat{x}(\cos(2\pi f_1 t) + \cos(2\pi f_2 t))\alpha_3\right)$$

$$x(t)x(t) = \hat{x}\cos(\omega t)\hat{x}\omega g(\cdot)\alpha_i x'(t)x'(t) =$$
$$g(x(t)) = \left(\alpha_1\hat{x} - \frac{3}{4}\alpha_3\hat{x}^3\right)\cos(\omega t) - \frac{1}{4}\alpha_3\hat{x}^3\cos(3\omega t)\omega 3\omega x_{RF}(t)x(t) =$$
$$\hat{x}(\cos(2\pi f_1 t) + \cos(2\pi f_2 t))\alpha_3$$

$$x(t)x(t) = \hat{x}\cos(\omega t)\hat{x}\omega g(\cdot)\alpha_i x'(t)x'(t) =$$
$$g(x(t)) = \left(\alpha_1\hat{x} - \frac{3}{4}\alpha_3\hat{x}^3\right)\cos(\omega t) - \frac{1}{4}\alpha_3\hat{x}^3\cos(3\omega t)\omega 3\omega x_{RF}(t)x(t) =$$
$$\hat{x}(\cos(2\pi f_1 t) + \cos(2\pi f_2 t))\alpha_3$$

then IM products can additionally arise, wherein in the case of a two-tone signal having frequencies $f_1$ and $f_2$ the third-order term (parameter) of the Taylor series (cf. equation 1) is responsible for the formation of the IM products with the frequencies $2f_1-f_2$, $2f_2-f_1$, $2f_1-f_2$, $2f_2+f_1$, wherein the last two IM products (with frequencies $2f_1-f_2$ and $2f_2+f_1$) are generally unproblematic because they are filtered out by the low-pass filter 21a (see FIG. 5) in the baseband signal processing chain. However, the IM products with the frequencies $2f_1-f_2$, $2f_2-f_1$ may lie in the frequency range of interest for radar measurements and therefore disturb the measurement.

Figure 8:
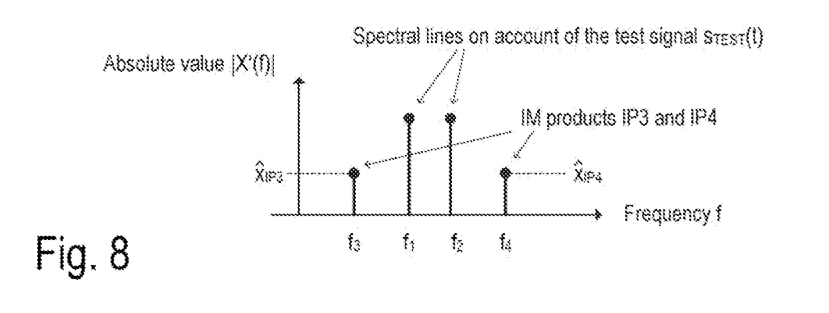
FIG. 8 illustrates the intermodulation products which arise as a result of nonlinear distortions.

The second-order term is responsible for the arising of the IM products with the frequencies $f_1-f_2$ and $f_1-f_2$. The fifth-order term (parameter $\alpha_5$) is responsible for the arising of the IM products with the frequencies $4f_1\pm f_2$, $4f_2\pm f_1$, $3f_1\pm 2f_2$, and $3f_2\pm 2f_1$. For the case of excitation of the nonlinear system 22 (see FIG. 6) with a two-tone signal (cf. equation 4), the amplitudes of the IM products that arise can be calculated. These amplitudes are dependent on the amplitude 2 of the input signal x(t) and also on the Taylor coefficients considered. For the third-order term of the Taylor series, that means that the amplitude $\hat{x}_{IP3}$ of the IM product IP3 at the frequency $f_3=2f_1-f_2$ is a function of $\hat{x}$ and $\alpha_3$. The amplitude $\hat{x}_{IP4}$ of the IM product IP4 at the frequency $f_4=2f_2-2f_1$ is likewise a function of $\hat{x}$ and $\alpha_3$. FIG. 8 shows an example of a spectrum of the baseband signal x'(t) with spectral lines at the frequencies $f_1$ and $f_2$, which originate from the test signal $s_{TEST}(t)$, and with further spectral lines at the frequencies $f_3$ and $f_4$, which originate from the IM products IP3 and IP4.

In view of the discussion above, it can be established that the Taylor coefficient can be calculated from the amplitude $\hat{x}_{IP3}$ of the IM product IP3 (or the amplitude $\hat{x}_{IP4}$ of the IM product IP4) and the (known) amplitude $\hat{x}$. The amplitudes $\hat{x}_{IP3}$ and $\hat{x}_{IP4}$ can be calculated based on the baseband signal x'(t). Since the frequencies $f_1$ and $f_2$ of the test signal (downconverted to baseband) and thus also the frequencies $f_3$ and $f_4$ of the IM products IP3 and IP4 are known, the amplitudes $\hat{x}_{IP3}$ and $\hat{x}_{IP4}$ can be calculated for example using a Goertzel algorithm or a fast Fourier transform (FFT). The parameter/Taylor coefficient $\alpha_3$ can be calculated or at least estimated or approximated therefrom. The aforementioned algorithms (Goertzel and FFT) are known per se and will therefore not be discussed any further here.

Reference will now be made once again to FIG. 5. The latter shows the function block 41 configured, in a first mode of the radar device (in which the test signal $s_{TEST}(t)$ is fed to the mixer 104 as input signal), to identify at least one intermodulation product (e.g., IP3 or IP4) (e.g., by determining the associated spectral line) and to ascertain therefrom at least one parameter (e.g., the Taylor coefficient $\alpha_3$) of a model which characterizes the nonlinearity of the signal path considered.

As mentioned, the model can also have higher-order terms (order greater than three). As discussed thoroughly above, memoryless nonlinear systems can be modeled using Taylor series. In this case, the parameters describing the model are the Taylor coefficients up to the desired order. However, the concept described here is not restricted to memoryless nonlinear systems and Taylor series. In this regard, nonlinear systems having memory can be modeled using Volterra series, for example. In this case, the so-called Volterra kernel up to the n-th order can be determined instead of the Taylor coefficients. Methods exist for estimating Volterra kernel coefficients, for which reason the latter will not be discussed any further here.

As explained above, by analyzing the IM products in the baseband signal, it is possible to determine one or more parameters of a mathematical model (e.g., Taylor or Volterra series) which characterizes the nonlinearity of the signal path under consideration. These parameters can be stored and used later to suppress, e.g., at least partly compensate for, the undesired IM products in the (digitized) baseband signal x'[n]. That is to say that in a second mode of the radar device (in which an antenna signal a(t) is fed to the mixer 104 as input signal, e.g., during a radar measurement), at least one intermodulation product in the digital output signal (x'[n]) is suppressed based on the at least one stored parameter (e.g., the Taylor coefficient $\alpha_3$ and, if appropriate, further coefficients) and the baseband signal x'(t). The suppression/compensation of IM products is carried out in the function block 42 in the example illustrated in FIG. 5.

Based on the output signal x̃[n], in which the IM products under consideration have been suppressed/compensated for, a detection of radar targets can take place in a conventional manner. In general, a range Doppler analysis of the received radar data is carried out for this purpose. Suitable algorithms and methods for this purpose are sufficiently known and will therefore not be discussed any further here. The preprocessing of the digital radar signal x'[n] for suppressing the effects of nonlinearities in the analog signal processing chain can however improve the quality of the detection of radar targets. Particularly on account of an improved SINAD (signal-to-interference ratio including noise and distortion) value, radar targets can be detected and localized with improved accuracy.

$$x'[n]\alpha_3 \cdot x^3 \alpha_3 x[n] \alpha_3 \cdot x[n]^3 \alpha_3 \cdot x[n]^3 \approx \alpha_3 \cdot x'[n]^3$$

Figure 9:
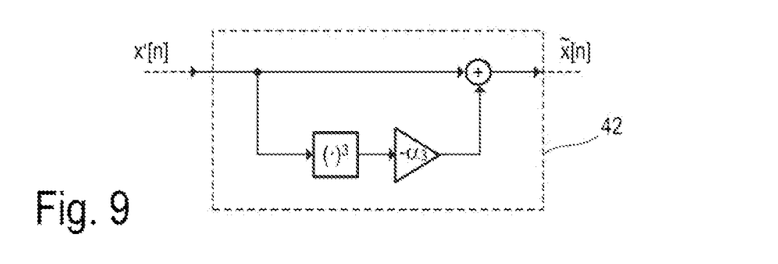
FIG. 9 illustrates an example of the suppression/compensation of nonlinear distortions in the digital radar signal.

FIG. 9 illustrates an example of an implementation of the function block 42 for suppressing nonlinear distortions in the digital radar signal (output signal of the analog-to-digital converter 30, see FIG. 5). Only those nonlinear distortions (IM products) which are caused by the third-order term (see equation 1) are considered in the example illustrated. The associated Taylor coefficient can be estimated and stored as described above. Since the distortion-free signal is not available, the signal (correction signal) is approximated as follows:

$$x'[n]\alpha_3 \cdot x^3 \alpha_3 x[n] \alpha_3 \cdot x[n]^3 \cdot x[n]^3 \approx \alpha_3 \cdot x'[n]^3$$

$$x'[n]\alpha_3 \cdot x^3 \alpha_3 x[n] \alpha_3 \cdot x[n]^3 \cdot x[n]^3 \approx \alpha_3 \cdot x'[n]^3$$

$$x'[n]\alpha_3 \cdot x^3 \alpha_3 x[n] \alpha_3 \cdot x[n]^3 \cdot x[n]^3 \approx \alpha_3 \cdot x'[n]^3$$

$$x'[n]\alpha_3 \cdot x^3 \alpha_3 x[n] \alpha_3 \cdot x[n]^3 \cdot x[n]^3 \approx \alpha_3 \cdot x'[n]^3. \qquad (5)$$

The errors or the additional distortions (e.g., the IM products) which arise as a result of this approximation are negligibly small in practice and/or are eliminated by the analog filters 21a and 21b (see FIG. 5).

$$\alpha_3 \cdot x'[n]^3 x'[n] \tilde{x}[n] \tilde{x}[n] = x'[n] - \alpha_3 \cdot x'[n]^3 \tilde{x}[n] \tilde{x}[n] x[\tilde{n}]$$

The actual compensation/suppression of the nonlinear distortions are effected by subtracting the estimated IM products from the digital radar signal. The digital radar signal freed of interference is calculated in accordance with FIG. 9 as follows:

$$\alpha_3 \cdot x'[n]^3 x'[n] \tilde{x}[n] \tilde{x}[n] = x'[n] - \alpha_3 \cdot x'[n]^3 \tilde{x}[n] \tilde{x}[n] x[\tilde{n}]$$

$$\alpha_3 \cdot x'[n]^3 x'[n] \tilde{x}[n] \tilde{x}[n] = x'[n] - \alpha_3 \cdot x'[n]^3 \tilde{x}[n] \tilde{x}[n] x[\tilde{n}]$$

$$\alpha_3 \cdot x'[n]^3 x'[n] \tilde{x}[n] \tilde{x}[n] = x'[n] - \alpha_3 \cdot x'[n]^3 \tilde{x}[n] \tilde{x}[n] x[\tilde{n}]$$

$$\alpha_3 \cdot x'[n]^3 x'[n] \tilde{x}[n] \tilde{x}[n] = x'[n] - \alpha_3 \cdot x'[n]^3 \tilde{x}[n] \tilde{x}[n] x[\tilde{n}]. \qquad (6)$$

The signal can be processed further as an approximation of the ideal distortion-free signal. By way of example, radar targets can be detected based on the signal using range Doppler analysis or similar methods.

Figure 10:
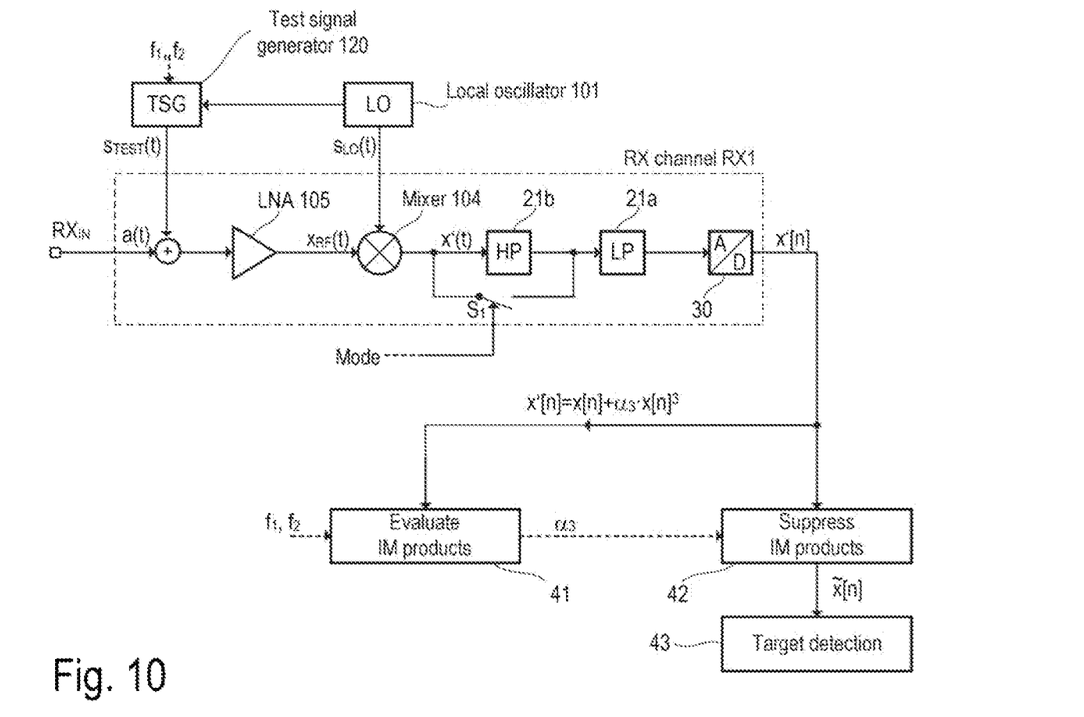
FIG. 10 illustrates a modification of the example from FIG. 5.

FIG. 10 illustrates a further example, which can be considered to be an alternative to the implementation from FIG. 5. The two examples are very similar, for which reason essentially only the differences between FIGS. 10 and 5 are discussed here. Unlike in the example in FIG. 5, the test signal $s_{TEST}(t)$ is fed into the RF signal path of the RX channel RX1 upstream of the LNA 105 rather than downstream of the LNA 105 (as an alternative to the antenna signal a(t)). Consequently, the nonlinearity characterized by the Taylor coefficient $\alpha_3$ contains not only the nonlinearity of the mixer 104, but additionally also the nonlinearity of the LNA 105, which improves the suppression of the nonlinear distortions (function block 42) during a radar measurement.

Unlike in FIG. 5, the additional analog-to-digital converter 31 is not necessary in the example shown in FIG. 10, since both in the first mode (identification/estimation of the model parameter $\alpha_3$) and in the second mode (carrying out radar measurements) the digital radar signal x'[n] is supplied by the analog-to-digital converter 30 of the receiving channel RX1. Instead, in the first mode, the filters 21a, 21b or parts of the filter chain (e.g., only the high-pass filter 21b, cf. FIG. 10) can be bypassed in order that the ascertainment of the model parameter $\alpha_3$ (and, if appropriate, further model parameters) is not influenced by the transfer functions of the filters 21a, 21b. This bypassing of the filters 21a, 21b is symbolized by the switch Si in FIG. 10, which switch can be closed in the first mode and opened in the second mode, e.g., during the normal radar measurements. For example, the high-pass filter 21b could make it more difficult to identify the Taylor coefficient $\alpha_2$ of the second-order term if the frequency difference $f_1-f_2$ of the test signal is small (the second-order term generates an IM product at the difference frequency $f_1-f_2$). For the rest, reference is made to the above explanations referring to FIG. 5.

Figure 11:
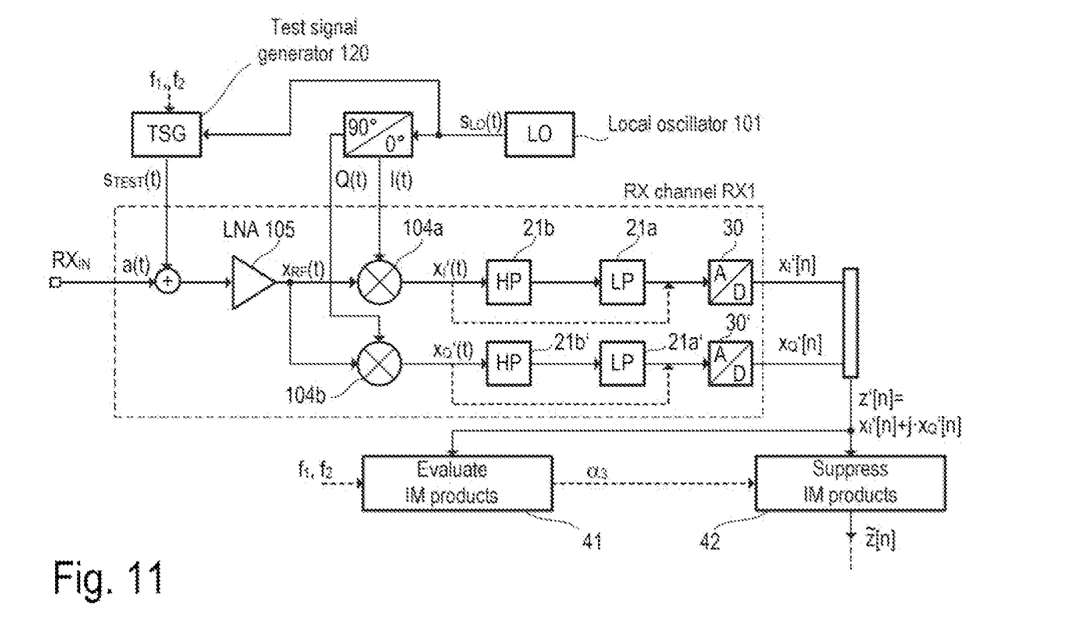
FIG. 11 illustrates a variant of the example from FIG. 10 with an IQ mixer.

FIG. 11 illustrates a variant of the example from FIG. 10 with an IQ mixer. In contrast to the example from FIG. 10, the mixer used is an IQ mixer comprising a first mixer 104a for the in-phase signal component and a second mixer 104b for the quadrature signal component. The analog baseband signal processing chain is thus doubly present in FIG. 11. The filters 21a and 21b filter the in-phase signal $x_I'(t)$, and the filters 21a' and 21b' filter the quadrature signal $x_Q'(t)$. The analog-to-digital converter 30 digitizes the in-phase signal and yields the digital in-phase signal $x_I'[n]$, and the analog-to-digital converter 30' digitizes the quadrature signal and yields the digital quadrature signal $x'_Q[n]$. In-phase and quadrature signals can be regarded as the real part and imaginary part of a complex signal z'[n], e.g., $z'[n]=x'_I[n]+jx'_Q[n]$, where j denotes the imaginary unit.

The identification and storage of the Taylor coefficients (function block 41) and the compensation of the nonlinear distortions (function block 42) and the subsequent detection of the radar targets (not illustrated in FIG. 11) also function with complex-valued digital radar signals substantially in the same way as with real-valued digital radar signals, as has been described in detail above.

Hereinafter, an example of a method which can be carried out with the radar systems described in FIGS. 5 to 11 is summarized with reference to the flow diagram in FIG. 12. Accordingly, the method comprises—in a first mode—feeding a test signal (cf. e.g., FIGS. 5, 10 and 11, signal $s_{TEST}(t)$) into a receiving channel of a radar device (see FIG. 12, step M10). As a result, the test signal is fed to a mixer (cf. e.g., FIGS. 5, 10, mixer 104, or FIG. 11, IQ mixer 104a-b) contained in the receiving channel and is thus downconverted to baseband (see FIG. 12, step M11). The baseband signal output at the mixer output includes intermodulation products on account of a nonlinearity of the transfer characteristic of the receiving channel. As mentioned, the nonlinearity is caused in particular by the active components (e.g., LNA, mixer, etc.) of the RF frontend of the receiving channel. Furthermore, in the first mode, at least one IM product is determined (see FIG. 12, step M12, cf. also FIG. 8, IM products IP3 and IP4) and, on the basis thereof, at least one parameter (e.g., a Taylor coefficient $\alpha_3$) of a model which characterizes the nonlinearity is ascertained and stored (see FIG. 12, step M13). Suitable models for characterizing nonlinearities are e.g., Taylor polynomials and Volterra series, as explained in detail above.

Figure 12:
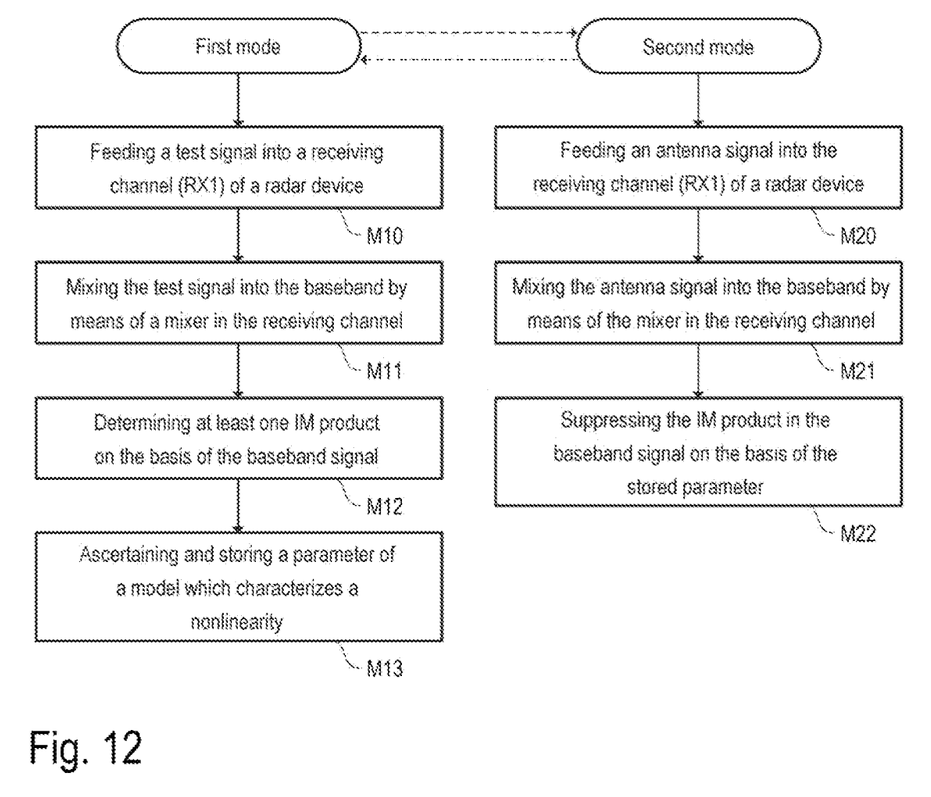
FIG. 12 is a flow diagram for illustrating an example of the method described here.

In a second mode, the method comprises feeding an antenna signal (cf. e.g., FIGS. 5, 10 and 11, signal a(t)) into the receiving channel of the radar device (see FIG. 12, step M20). The antenna signal can contain, inter alia, radar echoes from real radar targets. The antenna signal is thus downconverted to baseband by the mixer in the receiving channel (see FIG. 12, step M21). Using the parameter ascertained and stored in the first mode, the (at least one) IM product in the baseband signal is suppressed in the second mode (see FIG. 12, step M22). An example implementation of step M22 is also illustrated as a block diagram in FIG. 9 and reference is made to the description above. The resulting baseband signal in which the at least one IM product has been suppressed (that is to say the equalized signal) can be used for detecting radar targets in a manner known per se.

The abovementioned parameters (e.g., Taylor coefficients or Volterra kernel coefficients) which characterize the nonlinearity are not static, rather they can vary. In particular, these parameters may be dependent on the present operating conditions (e.g., temperature, supply voltage, mechanical stress of the MMIC, etc.) or may change as a result of aging of the MMIMs. For this reason, the ascertainment/identification of the parameters which characterize the nonlinearity should be regularly repeated. In other words, the radar system changes regularly (e.g., periodically or from time to time) from the second mode (detection of radar targets based on the equalized baseband signal) to the first mode (identification of the at least one parameter which characterizes the nonlinearity) in order to update the parameter, and then back to the second mode again in order to continue the radar measurements.

In practice, nonlinearities are excited in the radar receiver in particular by very close radar targets which, in baseband, can actually be found in the stop band of the high-pass filter (cf. FIG. 5, filter 21b). Nevertheless, IM products can be produced in the passband of the baseband signal processing chain. In practice, these very close radar targets are problematic because the signal level of the backscattered radar signals is comparatively high, and thus so is the signal level of the IM products. The signal level of the IM products on account of close radar targets can be higher than the signal level caused by more distant radar targets in baseband.

In automotive applications, for example, the fender with a radar sensor arranged behind it can constitute an undesired close radar target. Reflections at the fender cause in the baseband signal a signal component at very low frequencies (in the stop band of the high-pass filter 21b) but with comparatively high power, for which reason the IM products that arise may also have a non-negligible signal power. This similarly applies to crosstalk from transmitting to receiving antenna. The IM products on account of these close, but undesired, radar targets can result in the detection of ghost targets.

As mentioned, reflections at close radar targets may have comparatively high signal levels which, however, are at relatively low frequencies, in particular in the stop band of the high-pass filter arranged in the baseband. In order to be able to ascertain the parameter(s) describing the nonlinearity, the high-pass filter must be bypassed/deactivated (cf. FIG. 5 or 10) in the first mode (e.g., during the ascertainment/identification of the model parameter(s)).

What is claimed is:

1. A radar device comprising the following:
   a receiving channel having a mixer, which is configured to generate a baseband signal from a radio frequency (RF) input signal by mixing with a local oscillator signal, wherein the receiving channel is further configured to generate a digital output signal based on the baseband signal, and wherein the baseband signal includes intermodulation products on account of a nonlinearity of a transfer characteristic of parts of the receiving channel;
   a test signal generator, which is configured to generate a test signal and to feed the test signal into an RF signal path of the receiving channel; and
   a signal processing unit, which is configured:
      in a first mode, in which the test signal is fed to the mixer as a first input signal, to determine at least one intermodulation product, of the intermodulation products, and to determine, based on the at least one intermodulation product, a parameter of a model which characterizes the nonlinearity, and to store the parameter; and
      in a second mode, in which an antenna signal is fed to the mixer as a second input signal, to attenuate the at least one intermodulation product in the digital output signal based on the parameter and the baseband signal.

2. The radar device as claimed in claim 1, wherein the nonlinearity of the transfer characteristic of the parts of the receiving channel is approximated by a Taylor polynomial, and wherein the parameter is a Taylor coefficient.

3. The radar device as claimed in claim 1, wherein the nonlinearity of the transfer characteristic of the parts of the receiving channel is approximated by a Volterra series, and wherein the parameter is a coefficient of a Volterra kernel.

4. The radar device as claimed in claim 1, wherein the signal processing unit is configured, in the first mode, based on the baseband signal, to determine an absolute value of a spectral line which is assignable to the at least one intermodulation product and, based on the absolute value of the spectral line, to ascertain the parameter of the model which characterizes the nonlinearity.

5. The radar device as claimed in claim 1, wherein the signal processing unit is configured, in the second mode, to generate a correction signal based on the digital output signal of the receiving channel and the stored parameter and to subtract the correction signal from the digital output signal to suppress the at least one intermodulation product.

6. The radar device as claimed in claim 5, wherein the signal processing unit is configured, in the second mode, to detect a radar target based on the digital output signal, after the at least one intermodulation product has been suppressed in the digital output signal.

7. The radar device as claimed in claim 1, wherein the mixer is an IQ mixer, and wherein the baseband signal and the digital output signal each have an in-phase component and a quadrature component.

8. The radar device as claimed in claim 1, wherein the test signal generator is configured to generate the test signal by modulating the local oscillator signal with a two-tone signal having two frequencies.

9. The radar device as claimed in claim 8, wherein the signal processing unit is configured, in the first mode, based on the baseband signal, to determine an absolute value of a spectral line which is assignable to the at least one intermodulation product and, based on the absolute value of the spectral line, to ascertain the parameter of the model which characterizes the nonlinearity, and wherein the spectral line has a frequency which is dependent on the two frequencies of the two-tone signal.

10. A method comprising:

in a first mode: feeding a test signal into a receiving channel of a radar device, such that the test signal is fed to a mixer contained in the receiving channel and is thus downconverted to a baseband, wherein a baseband signal that includes intermodulation products on account of a nonlinearity of a transfer characteristic of the receiving channel is provided at a mixer output;

generating a digital output signal based on the baseband signal;

in the first mode: determining at least one intermodulation product and, based on the at least one intermodulation product, ascertaining a parameter of a model which characterizes the nonlinearity, and storing the parameter; and in a second mode, in which an antenna signal is fed to the mixer as an input signal: suppressing the at least one intermodulation product in the digital output signal based on the parameter and the baseband signal.

11. The method as claimed in claim 10, wherein suppressing the at least one intermodulation product in the digital output signal comprises:

calculating a correction signal based on the digital output signal and the stored parameter, and subtracting the correction signal from the digital output signal.

12. The method as claimed in claim 10, further comprising: in the first mode:

bypassing a high-pass filter connected downstream of the mixer.

13. A radar system comprising:

a radar sensor; and a radar device comprising:

a receiving channel comprising:

a radio frequency (RF) signal path, and a mixer configured to generate a baseband signal based on an RF input signal a local oscillator signal, wherein the receiving channel is configured to:

generate a digital output signal based on the baseband signal, wherein the baseband signal includes an intermodulation product associated with a nonlinearity of a transfer characteristic of the receiving channel;

a test signal generator configured to:

generate a test signal, and provide the test signal into the RF signal path; and a signal processing unit configured to:

in a first mode:

determine the intermodulation product, and determine, based on the intermodulation product, a parameter of a model, wherein the model characterizes the nonlinearity, and wherein the first mode is associated with the test signal being provided to the mixer as a first input signal; and in a second mode:

attenuate the intermodulation product in the digital output signal based on the parameter and the baseband signal, wherein the second mode is associated with an antenna signal being provided to the mixer as a second input signal.

14. The radar system as claimed in claim 13, wherein the nonlinearity of the transfer characteristic of the receiving channel is approximated by a Taylor polynomial, and wherein the parameter is a Taylor coefficient.

15. The radar system as claimed in claim 13, wherein the nonlinearity of the transfer characteristic of the receiving channel is approximated by a Volterra series, and wherein the parameter is a coefficient of a Volterra kernel.

16. The radar system as claimed in claim 13, wherein the signal processing unit is further configured to:

determine, in the first mode and based on the baseband signal, an absolute value of a spectral line, wherein the spectral line is associated with the intermodulation product; and determine, based on the absolute value of the spectral line, the parameter.

17. The radar system as claimed in claim 13, wherein the signal processing unit is further configured to:

generate, in the second mode, a correction signal based on the digital output signal of the receiving channel and the parameter; and suppress the intermodulation product based on subtracting the correction signal from the digital output signal.

18. The radar system as claimed in claim 17, wherein the signal processing unit is further configured to:

detect, in the second mode, a radar target based on the digital output signal, after the intermodulation product has been suppressed in the digital output signal.

19. The radar system as claimed in claim 13, wherein the mixer is an IQ mixer, and wherein the baseband signal and the digital output signal each have an in-phase component and a quadrature component.

20. The radar system as claimed in claim 13, wherein the test signal generator is configured to generate the test signal by modulating the local oscillator signal with a two-tone signal having two frequencies, and wherein the signal processing unit is further configured to:

determine, in the first mode and based on the baseband signal, an absolute value of a spectral line associated with the intermodulation product; and determine, based on the absolute value of the spectral line, the parameter, wherein the spectral line has a frequency that is dependent on the two frequencies of the two-tone signal.

21. The radar device as claimed in claim 1, wherein in the second mode, the signal processing unit is configured to estimate the at least one intermodulation product based on the parameter to generate at least one estimated intermodulation product, and subtract the at least one estimated intermodulation product from the digital output signal to generate a compensated digital output signal.

* * * * *